Sept. 29, 1942.        J. D. MOONEY        2,297,012
APPARATUS FOR ILLUSTRATING ECONOMICS
Filed March 18, 1942        6 Sheets-Sheet 1

INVENTOR
JAMES D. MOONEY
BY Ridsdale Ellis
ATTORNEY

Sept. 29, 1942.  J. D. MOONEY  2,297,012
APPARATUS FOR ILLUSTRATING ECONOMICS
Filed March 18, 1942  6 Sheets-Sheet 2

INVENTOR
JAMES D. MOONEY
BY
ATTORNEY

Sept. 29, 1942.   J. D. MOONEY   2,297,012
APPARATUS FOR ILLUSTRATING ECONOMICS
Filed March 18, 1942   6 Sheets-Sheet 3
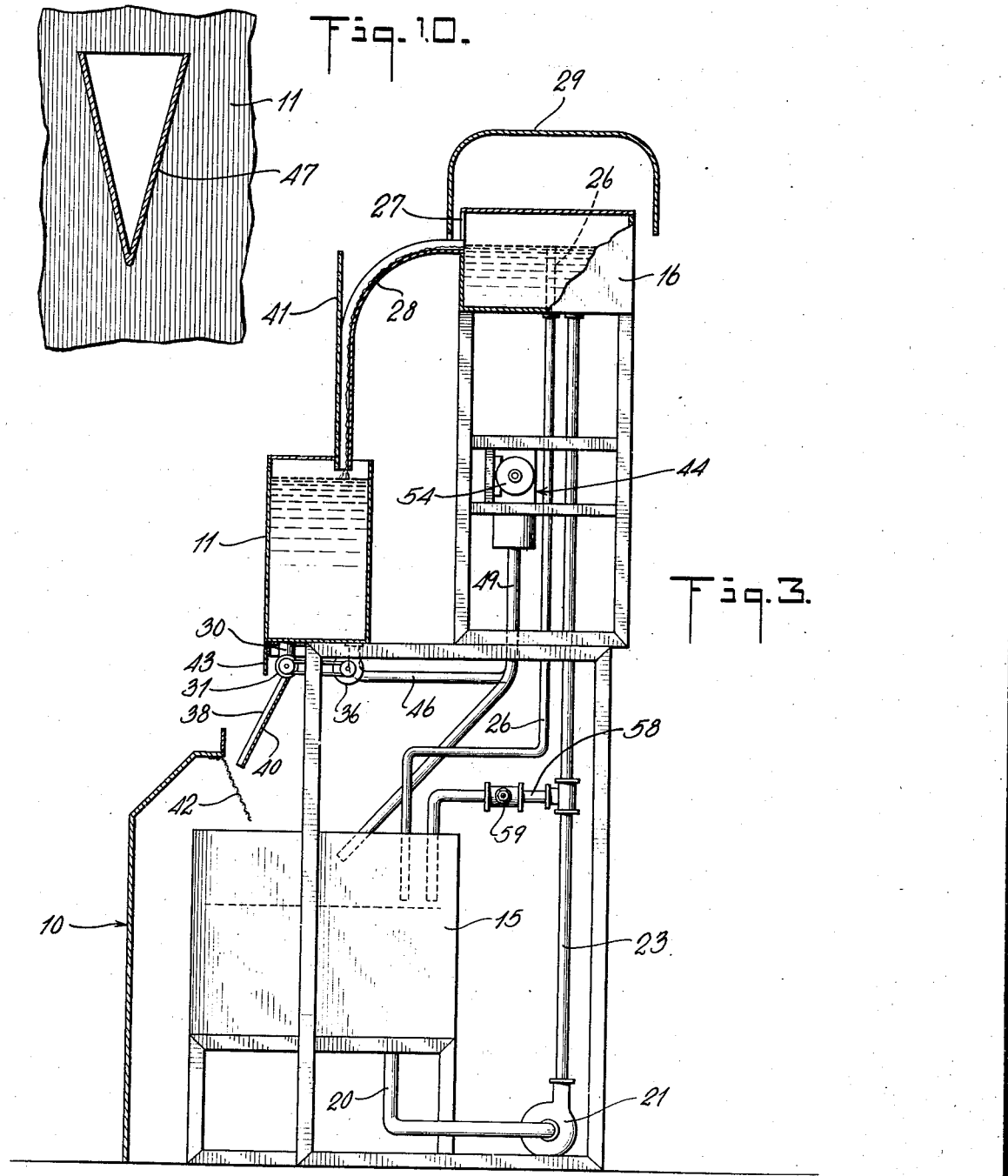
INVENTOR
JAMES D. MOONEY
BY
ATTORNEY

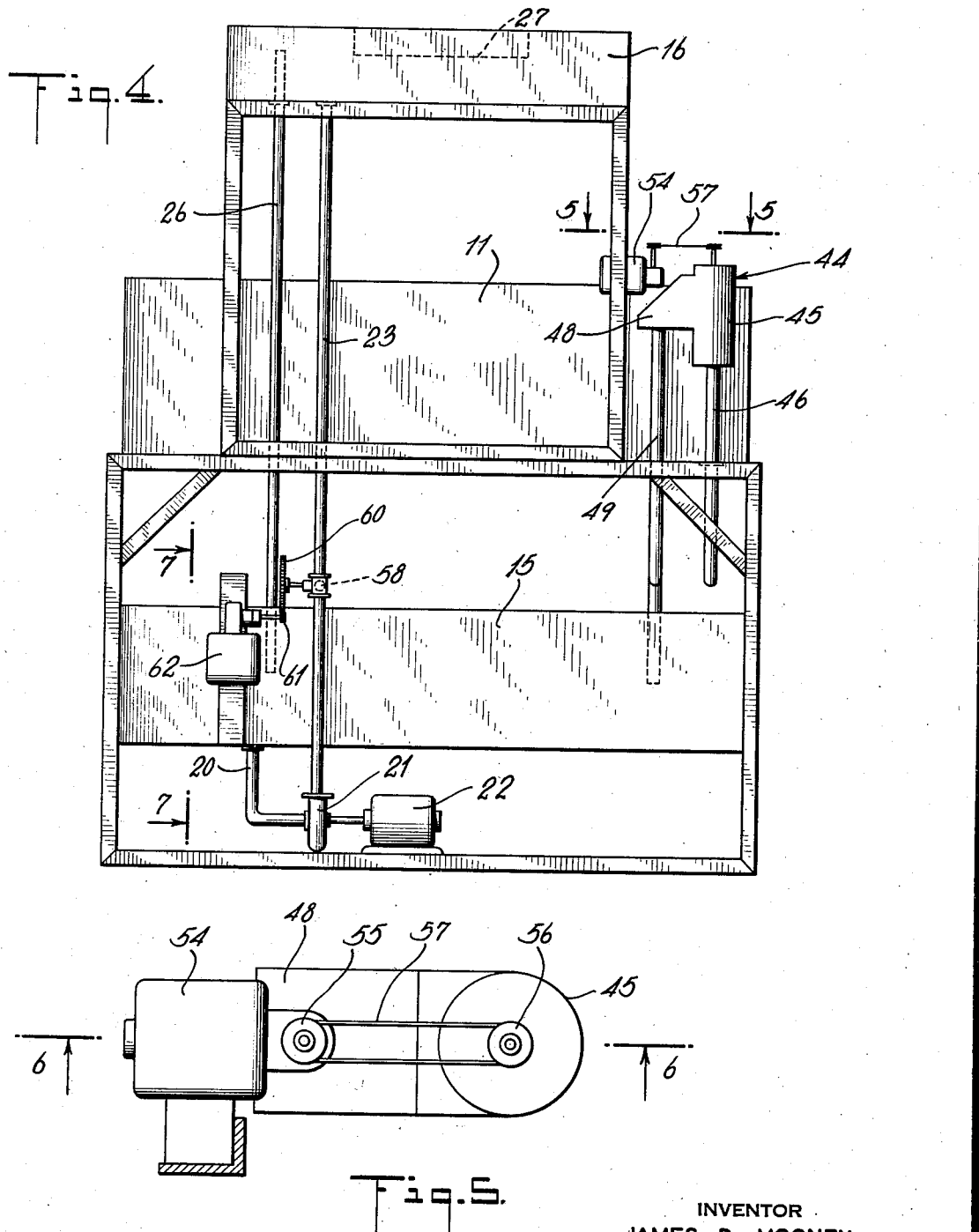

Sept. 29, 1942.   J. D. MOONEY   2,297,012
APPARATUS FOR ILLUSTRATING ECONOMICS
Filed March 18, 1942   6 Sheets-Sheet 5
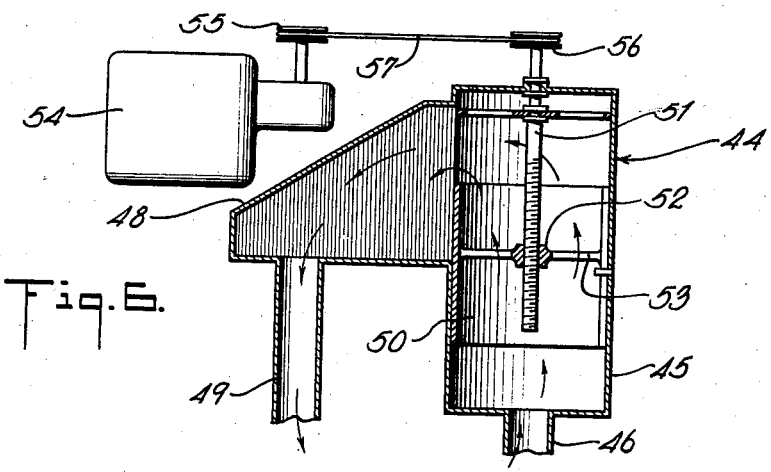
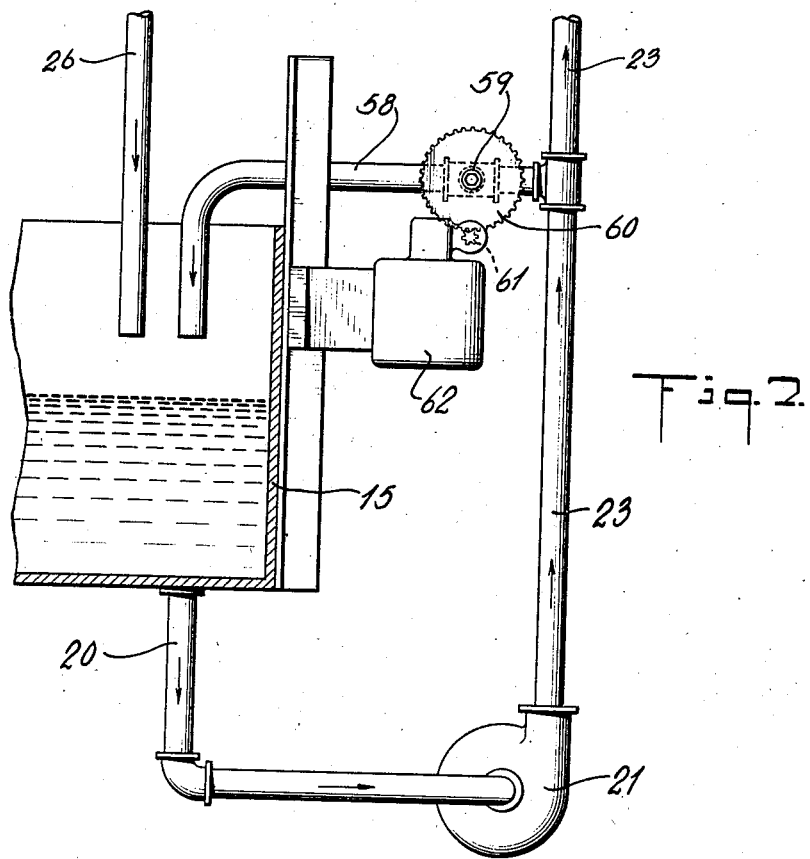
INVENTOR
JAMES D. MOONEY
BY
ATTORNEY Sept. 29, 1942.　　　　J. D. MOONEY　　　　2,297,012
APPARATUS FOR ILLUSTRATING ECONOMICS
Filed March 18, 1942　　　6 Sheets-Sheet 6
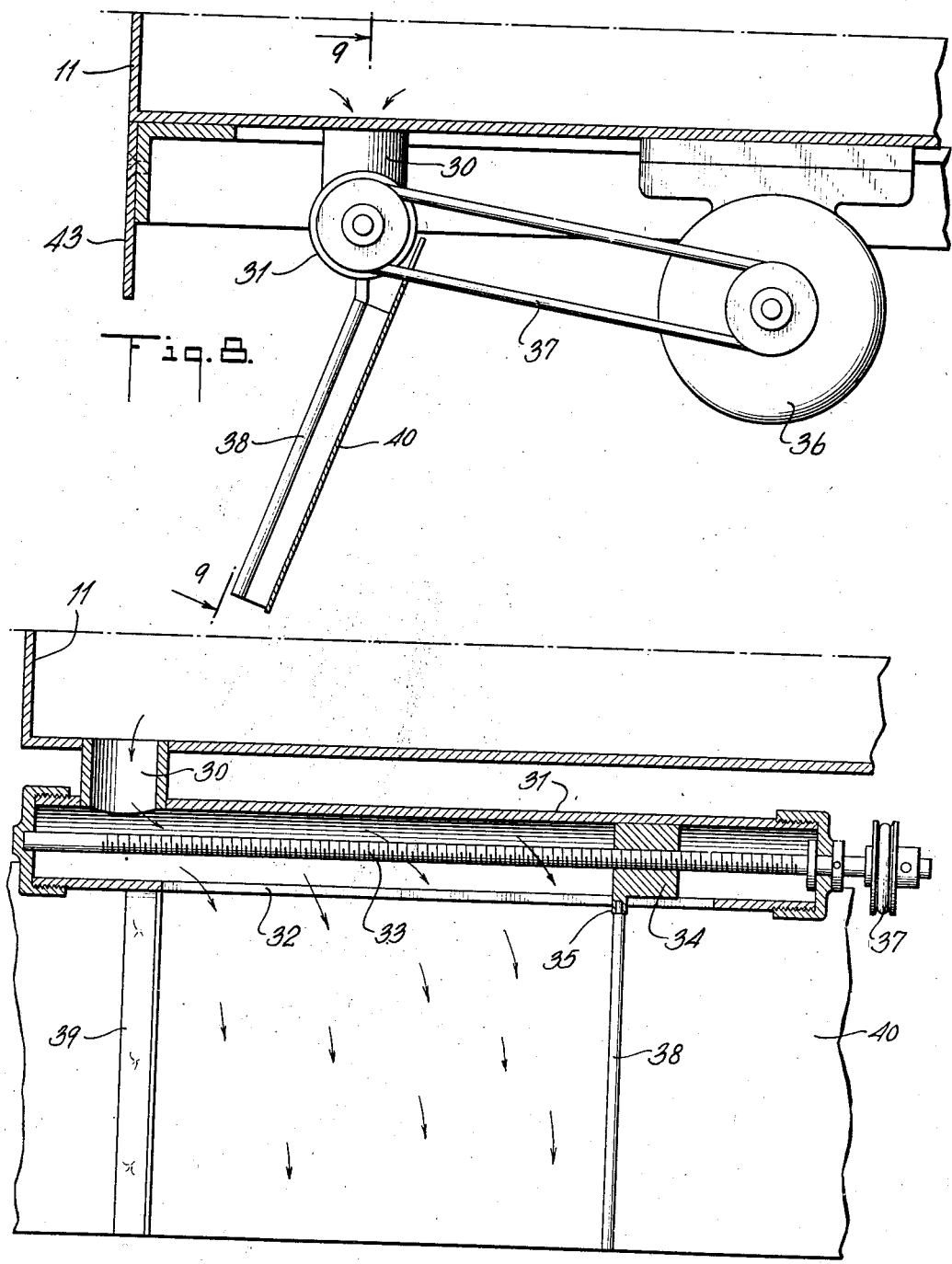
INVENTOR
JAMES D. MOONEY
ATTORNEY Patented Sept. 29, 1942

2,297,012

UNITED STATES PATENT OFFICE 2,297,012

APPARATUS FOR ILLUSTRATING ECONOMICS

James D. Mooney, Oyster Bay, N. Y.

Application March 18, 1942, Serial No. 435,201

12 Claims. (Cl. 35—24)

This invention relates to apparatus for illustrating economics in a three dimensional graphic form, and is specially designed to provide a continuously moving representation of the inter-play of economic forces.

The invention is particularly adapted to illustrate the continuous flow of capital through industry, and how the system of free enterprise tends to regenerate itself through reinvestment and new enterprise.

The usual method of setting forth a financial summary of a year's operations, whether of an individual, a corporation or industry as a whole is to give a series of totals: the total income for the year, the corresponding totals for each item of expenditure, and the difference between income and expenditure, which means saving for an individual and net profit or surplus for a corporation or industry. That gives a static summary. Especially in the case of a corporation or industry, the actual operation is a continuous performance. Some of the factors may be fixed but most of them are changed frequently. The effects of any change may not be readily apparent immediately, but movement in a direction to produce a pronounced effect begins as soon as such change is made.

One of the chief objects, therefore, of the present invention, is to provide a continuously moving representation of income and expenditure and their inter-relationships.

The inter-relation of changes in wages and material costs, with respect to net income, the effect of variations in net income on such taxes as are based on net income, and the stifling effect of curtailments in net income on dividends, normal plant expansion and research and other development work, are hard to visualize from figures.

Another object, therefore, of the present invention, is to provide a three-dimensional graphic scheme whereby the financial operations of a corporation or industry may be illustrated and taught concretely, so that the mind obtains a physical picture to aid what have hitherto been largely, if not entirely, abstract conceptions.

According to the present invention, income is represented by a continuous flow of liquid while its consumption by the various items of expenditure is represented by bands of flowing liquid, the width of each of which corresponds to the rate at which money is spent for that particular item.

The preferred form of the invention includes means for admitting liquid to a tank in a thin sheet over an apron, the width of which sheet is 100 units. This tank has an overflow adjacent its top and a series of discharge slots adjacent its bottom, to represent a series of classified expenditures. Below the slots is a second apron over which the liquid discharged from said slots flows. The length of each slot is capable of being varied independently of the other slots, thereby varying the width of the band of liquid flowing down such apron from each slot, to represent variations in each type of expenditure. Adjacent the second apron is a set of graduations, one set for each band. The rate of admittance of liquid to the tank, the size of the slots, the distance of the slots below the overflow and the graduations are so proportioned relative to each other that when the total widths of the bands add up to 100 units, the level of liquid in the tank is substantially up to but not above the level of the overflow, to indicate that there is no surplus of income over expenditures.

A further object of the invention is to provide means for showing the relationship between gross income, operating expenses, taxes, dividends and surplus. To carry this object into effect three tanks are arranged in series, so that the first tank overflows into the second and the second into the third. Liquid is admitted into the first tank at a predetermined rate to represent gross income. The first tank has a series of discharge outlets of variable cross-section to represent operating expenses so that the overflow from the first tank represents net income. The second and third tanks each have a discharge outlet of variable cross-section to represent taxes and dividends respectively. The overflow from the third tank represents surplus for reserve, reinvestment, research and development work.

One suitable form of apparatus embodying this invention is illustrated, by way of example, in the accompanying drawings, wherein:

Fig. 3 is, in part, a vertical section on the line 3—3 of Fig. 1 and in part an end elevation of the left hand part of Fig. 1;

Fig. 4 is a rear elevation of one end of the apparatus;

Fig. 5 is a section on the line 5—5 of Fig. 4;

Fig. 6 is a section on the line 6—6 of Fig. 5;

Fig. 7 is a section on the line 7—7 of Fig. 4;

Fig. 8 is a section on the line 8—8 of Fig. 1;

Fig. 9 is a section on the line 9—9 of Fig. 8; and

Fig. 10 is a section on the line 10—10 of Fig. 2.

Figure 1:
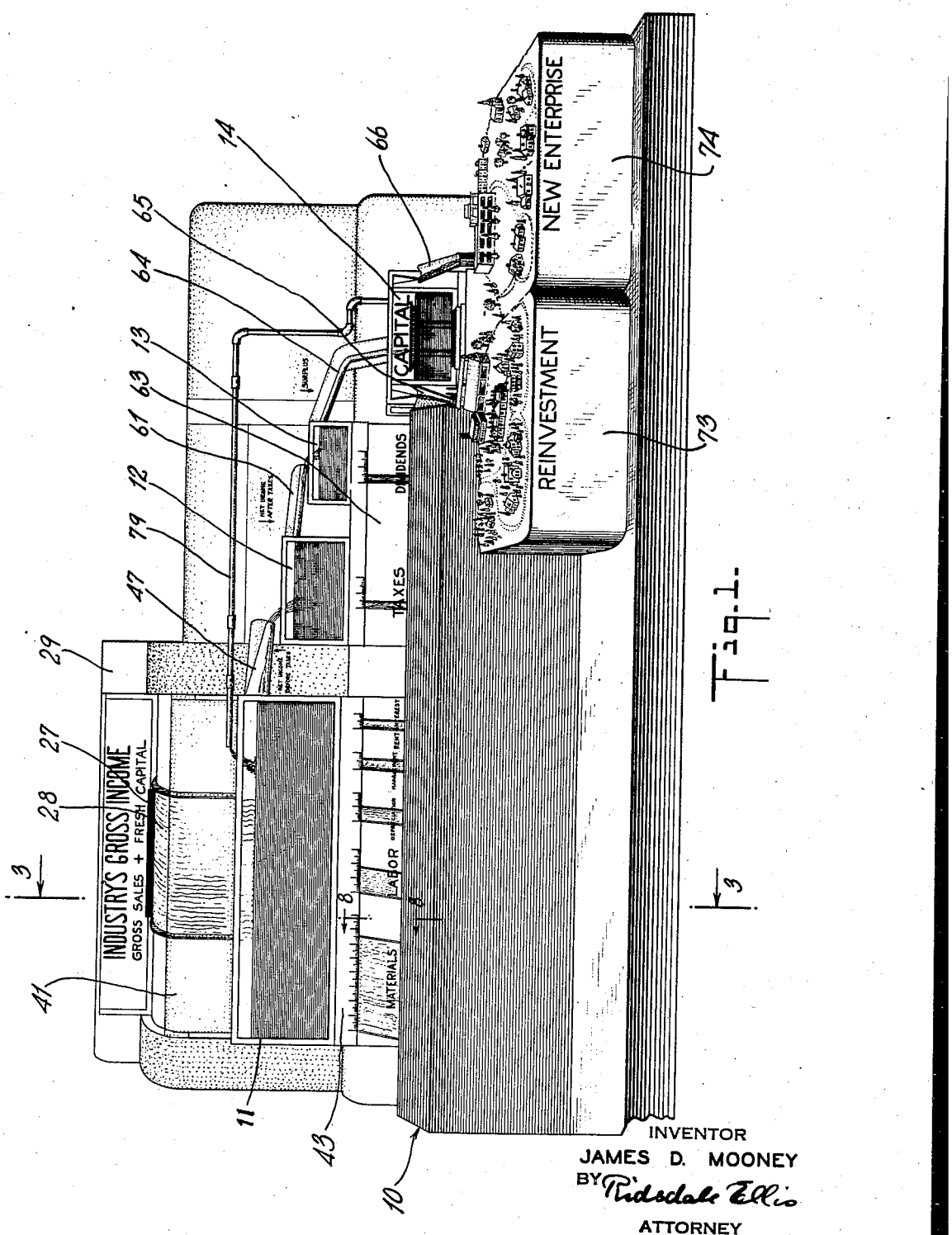
Fig. 1 is a perspective front view of the apparatus as a whole.

The apparatus comprises a cabinet 10 having on its front and top side a series of tanks 11, 12, 13, and 14. At the back of and underneath the top of the cabinet are other tanks 15, 16 and 17.

Tank 15 is the main reservoir for the oil or other fluid used for operating the apparatus. From the bottom of the tank runs a pipe 20 to a centrifugal pump 21 driven by a motor 22. This pump forces oil through pipe 23 into the tank 16.

The tank 16 has two outlets, first, a slot 27 (Fig. 3) over the lower edge of which oil can flow in a broad thin stream onto the apron 28. Oil from this apron falls into the tank 11. The other outlet for tank 16 is an overflow pipe 26 leading back to the main reservoir 15. The purpose of this pipe is to maintain the level constant in tank 16. Over the tank 16 is a hood 29 on the front of which is the legend "Industry's gross income" and also, if desired, a scale of the same length as the slot 27 divided into 100 units. A glass plate 41 extends across the front of apron 28 to keep oil from splashing out into the room in which the apparatus is located.

The tank 11 has adjacent its forward lower edge a series of short outlet pipes 30. In the apparatus shown, there are five of these outlets corresponding to the legends "Materials," "Labor," "Depreciation," "Management" and "Rent-interest." Each outlet leads to one or other of five tubes 31, Figs. 8, 9 and 10, closed at both ends and provided with a slot 32 along its bottom. Extending axially through each tube is a threaded shaft 33 on which a piston 34 is mounted. This piston has a lug 35 extending through the slot. This lug, by engaging the walls of the slot 32, prevents rotation of the piston so that by turning the shaft by motor 36 and belt 37 the piston can be moved along the tube 31 so as to vary the effective length of the slot therein.

The five slots discharge oil over an apron 40 on which the legends "Materials," etc., are printed. A strip of gauze 42 along the lower edge of this apron collects the oil flowing over it and returns it to the main reservoir 15. Depending from the lower front margin of the tank 11 is a plate 43 which serves the double purpose of concealing the tubes 31 and carrying five sets of graduations by which the width of the bands of oil flowing over the apron 40 can be observed.

While liquids of low viscosity, such as water, could be used, much smoother-flowing bands can be obtained by using liquids of considerably greater viscosity. S. A. E. 10 motor oil has proved excellent for this purpose. To enable the bands of liquid to be more readily observed, the aprons are made of white enamel and a liquid is used which is more or less colored. The usual grades of automobile lubricating oil have sufficient color for such purpose. Additional coloring matter may be used, if desired. The term "colored" liquids is intended to include liquids which are black or partially opaque.

To keep the sides of the bands of oil flowing from the slots 32 parallel, devices 38 resembling an automobile windshield wiper are connected to the lugs 35 on the pistons so that they move to and fro over the apron with movements of the pistons and thereby are always located exactly at the adjacent ends of the slots. Angle bars 39 are secured to the apron 40 adjacent the other ends of the slots to keep the bands of oil spreading away from the devices 38.

The tank 11 has an overflow spout 47 for any oil in excess of the amount discharged through the slots 32. The width of the slots 32, depth of the band of oil flowing through the slot 27 and the head of oil above these slots and the graduations on 43 may be so adjusted relatively to each other that, when the total effective lengths of the five slots 32 add up to 100 units oil will accumulate in tank 11 until the level thereof reaches the bottom of the overflow spout 47. That relationship is desirable to indicate that when 100% of the gross income is spent for materials, labor, depreciation, management, rent and interest, there is nothing left for taxes, dividends and surplus. If, however, the effective length of one or more of the slots is decreased, so that the total slot length is only 80 units, then 20% of the gross income, as represented by the flow over apron 28, will spill over into tank 12 through the spout 47.

One advantage of spreading the liquid used for demonstration into thin bands is to enable relative small flows of liquid to produce relatively large visual effects. To keep the visual effect of the overflow through spout 47 in the same general relationship to the rate of flow therethrough, it is desirable to have a narrow deep spout. Further, by making the spout V-shaped, as shown in Fig. 10, it is possible to accentuate the apparent volume of small rates of flow and at the same time afford adequate carrying capacity for large rates of flow.

Figure 2:
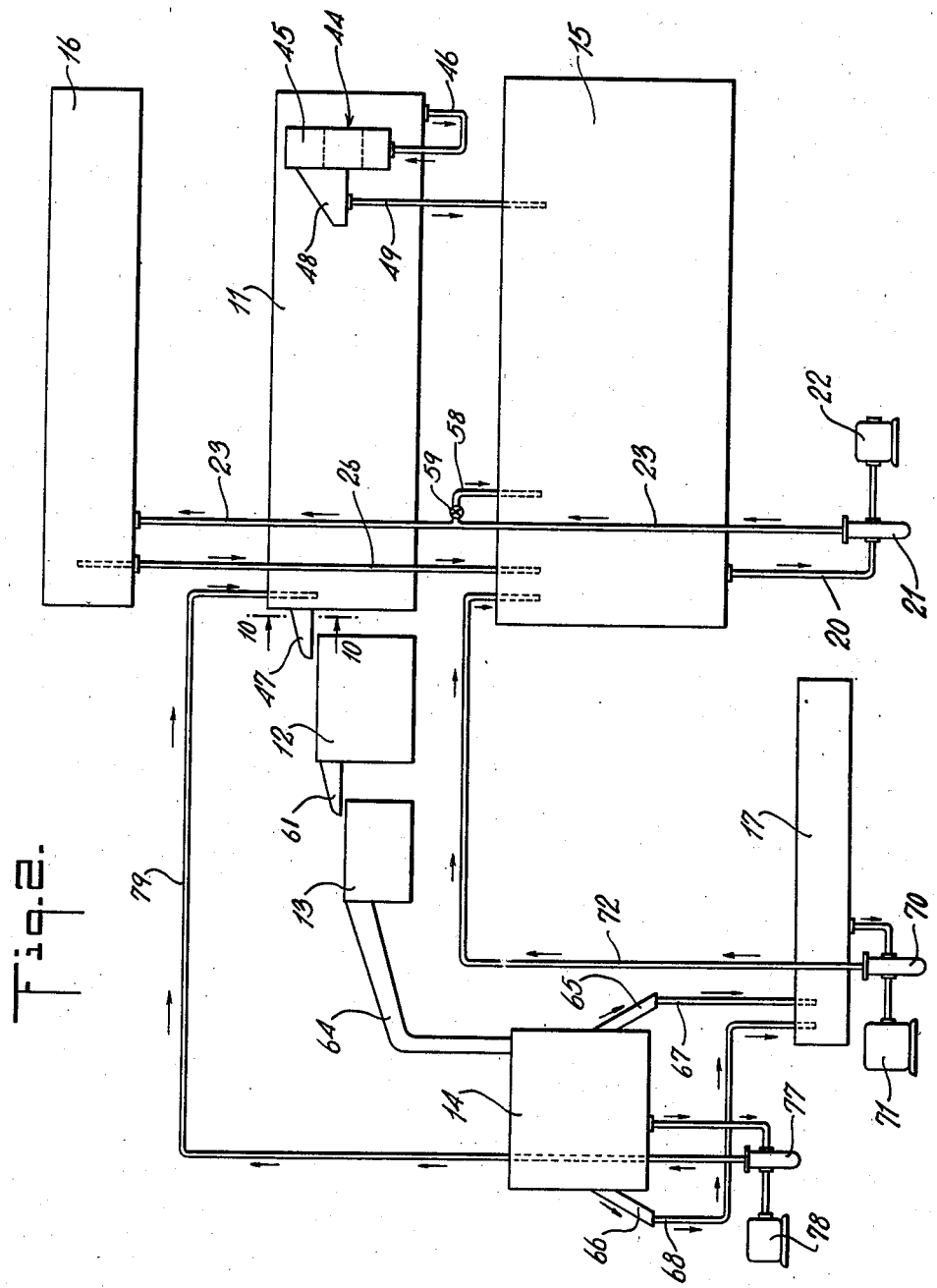
Fig. 2 is a diagrammatic rear elevation of the tanks and connecting piping.

For demonstration purposes it is often desirable to fill the tank 11 quickly and then reduce the flow thereto. That can be done by speeding up the flow of oil so that an excessive amount of oil flows down over the apron 28 into tank 11. As the amount of oil which can escape through the slots in the tubes 32 is limited and the overflow spout 47 can carry only a small flow of oil, it is desirable to provide supplemental overflow means to prevent the contents of the tank 11 running over and flooding the entire machine. This supplemental overflow device, designated generally as 44, is shown in detail in Fig. 6, while its relation to the rest of the apparatus is shown in Figs. 2 and 4.

This overflow device comprises intake and discharge compartments connected together. Between these compartments is a gate or weir, the height of which can be adjusted to vary the level at which liquid in the intake compartment can spill over into the discharge compartment.

The intake compartment comprises a cylinder 45 closed top and bottom. A pipe 46 allows oil to enter the bottom of the cylinder from the tank 11. Atttached to one side of the cylinder is the discharge compartment consisting of a chamber 48 having a discharge pipe 49 leading therefrom to the tank 15. To enable the oil level in tank 11, at which the overflow device 44 begins to operate, to be adjusted, a sleeve 50 is slidably but non-rotatably mounted in the cylinder 45. Various means may be used for adjusting the height of this sleeve. One convenient method is by means of a shaft 51. Centrally and rotatably mounted within the cylinder 45 and having threaded engagement with the central boss 52 of a spider 53 within the sleeve 50 is a shaft 51. By turning the shaft 51 the height of the top of the sleeve 50, which constitutes the gate or weir over which the excess oil can discharge into the chamber 48, can be adjusted. A motor 54 is provided for rotating the shaft 51 in either direction by means of pulleys 55, 56 and belt 57.

To enable the flow of oil to tank 11 to be speeded up or reduced as desired, various methods are available. One is to change the speed of the motor 22 and thereby the output of the pump 21. Another, the one employed in the apparatus illustrated, is to run the pump 21 at constant speed and bypass a variable and adjustable amount of the oil delivered thereby back to the tank 15. This is accomplished by a pipe 58 connected to the pipe 23 and discharging into tank 15. A valve 59 is arranged in this pipe to control the flow therethrough. The spindle of this valve has mounted thereon a gear wheel 60 (Fig. 7) in mesh with a pinion 61 which is arranged to be rotated in one direction or the other, as desired, by a motor 62.

Tank 12 is provided with an overflow spout 60 discharging into tank 13, which, in turn, is provided with an overflow spout 61 discharging into tank 14. The tanks 12 and 13 (Figs. 1 and 2) are each provided at their lower front margins with slotted tubes (not shown) similar to 31 (Figs. 7 and 8) arranged to discharge a thin band of oil of variable width over the apron 63. These bands of oil are designed to represent "Taxes" and "Dividends" respectively.

The overflow from tank 13 through spout 64 represents "Surplus" flowing into the "Capital" tank 14. The tank 14, in turn overflows through spouts 65 and 66 into pipes 67 and 68 leading to tank 17, which acts as the sump for the system. A pump 70 driven by motor 71 returns the oil by pipe 72 back to the main reservoir tank 15.

The oil flowing through spout 65 represents surplus capital directed to "Reinvestments" in plant, machinery, housing for workers, etc. To illustrate graphically such use of surplus capital, models of a factory, workers' houses, etc., are grouped on a stand 73 in front of and below the spout 65.

Similarly, the oil overflowing through spout 66 represents surplus capital devoted to "New enterprise." Here again, the material embodiments of new enterprise, such as a manufacturing plant and community buildings necessarily associated with such a plant, are represented by a series of models on a stand 74.

In times of depression capital surplus in place of being reinvested in the same business or being invested in new enterprises, has to be used to make good operating losses. To represent such use of capital surplus means are provided for returning oil from the "Capital" tank 14 to tank 11 from which flow the oil streams representing "Materials," "Labor," etc. As shown, these means include a pump 77 driven by a motor 78 for drawing oil from tank 14 and forcing it through pipe 79 back to tank 11.

I claim:

1. In a hydraulic device for illustrating economic laws, a tank for viscous colored liquid, a discharge device for the liquid in said tank including a slot of variable length for discharging a band of such liquid of constant thickness but variable width and means for varying length of such slot and thereby the width of said band whereby the width of said band gives a visually observable measure of the rate of flow of the liquid.

2. In a hydraulic device for illustrating economic laws, means for discharging a band of viscous liquid of constant thickness but variable width, means for varying the width of said band whereby the width of said band gives a visually observable measure of the rate of flow of the liquid, a pair of guides extending parallel to the direction of flow of the liquid thereover to keep the sides of the band of liquid parallel and means for adjusting the distance between the guides to keep it in correspondence with the width of the band of liquid.

3. In a hydraulic device for illustrating economic laws, an apron, means for discharging a band of liquid of constant thickness over said apron, means for varying the width of said band whereby the width of said band gives a visually observable measure of the rate of flow of the liquid, a pair of guides on the surface of said apron extending parallel to the direction of flow of the liquid thereover to keep the sides of the band of liquid parallel and means for adjusting the distance between the guides to keep it in correspondence with the width of the band of liquid at its point of discharge onto said apron.

4. In a hydraulic device for illustrating economic principles, a longitudinally slotted tube, means for supplying liquid to the interior of said tube, adjacent one end of said slot, a closure for said slot slidable from the other end of said slot towards the first mentioned end to vary the length of the slot available for the discharge of liquid.

5. In a hydraulic device for illustrating economic principles, a longitudinally slotted tube, means for supplying liquid to the interior of said tube adjacent one end of said slot, a piston in said tube slidable from the other end of said slot towards the first mentioned end to vary the length of the slot available for the discharge of liquid.

6. In a hydraulic device for illustrating economic principles, a tank, means for supplying liquid thereto at a substantially constant rate, a discharge opening of adjustable cross-section in the lower part of said tank, and an overflow spout near the top of said tank, said spout being constructed of transparent material to enable the volume of overflow to be observed and also having a V-shaped cross-section to accentuate the apparent volume of small rates of flow and at the same time afford adequate carrying capacity for large rates of flow.

7. In a hydraulic device for illustrating economic laws, a tank, means for admitting liquid thereto, means for discharging liquid therefrom, at a point below the level of the liquid in the tank and an overflow device comprising intake and discharge compartments connected together, a weir therebetween, said intake compartment being connected to said tank below said weir and means for varying the height of said weir.

8. In a hydraulic device for illustrating economic laws, a tank, means for admitting liquid thereto, means for discharging liquid therefrom at a point below the level of liquid in the tank, an overflow conduit having a vertically extending opening at its upper end for the entry of liquid from said tank, a gate extending across the lower part of said opening and vertically slidable up and down to vary the level at which liquid can spill over said gate into said overflow conduit.

9. Apparatus for illustrating economic principles, comprising a tank, means for admitting liquid into said tank at a predetermined rate and adapted to represent income, said tank having an overflow at its top and a series of discharge slots adjacent its bottom and adapted to represent a series of classified expenditures, an apron below said slots over which the liquid discharged from said slots flows, and means for varying the width of the band of liquid flowing down the apron from each slot independently of the other bands whereby to represent variations in each type of expenditure.

10. Apparatus for illustrating economic principles, comprising a tank, a wide apron above said tank, means for passing a thin stream of liquid over said apron, into said tank to represent income, said tank whereby having an overflow at its top and a series of discharge slots adjacent its bottom and adapted to represent a series of classified expenditures, a second apron below said slots over which the liquid discharged from said slots flows, and means for varying the width of the band of liquid flowing down the second apron from each slot, independently of the other bands whereby to represent variations in each type of expenditure.

11. Apparatus for illustrating economic principles, comprising a tank, means for admitting liquid into said tank at a predetermined rate whereby to represent income, said tank having an overflow at its top and a series of discharge slots adjacent its bottom and adapted to represent a series of classified expenditures, an apron below said slots over which the liquid discharged from said slots flows in bands, means for varying the length of each slot independently of the other slots and thereby varying the width of the band of liquid flowing down the apron from each slot, whereby to represent variations in each type of expenditure, a series of sets of graduations adjacent said apron, one set for each band, the rate of admittance of liquid to said tank, the size of the slots, the distance the slots are below the overflow, and the scale of the graduations being so proportioned relative to each other that when the total widths of the bands add up to 100, the level of liquid in the tank is substantially up to but not above the level of the overflow whereby to indicate that there is no surplus of income over expenditures.

12. Apparatus for illustrating the economic principles underlying the operation of a corporation, comprising three tanks in series arranged so that the first tank overflows into the second and the second into the third, means for admitting liquid into the first tank at a predetermined rate whereby to represent gross income, the first tank having a plurality of discharge outlets of variable cross-section whereby to represent operating expenses, the second and third tanks each having a discharge outlet of variable cross-section to represent taxes and dividends respectively, and an overflow spout for the third tank whereby to represent surplus.

JAMES D. MOONEY.